US006414603B1

(12) United States Patent
Yamaguchi et al.

(10) Patent No.: US 6,414,603 B1
(45) Date of Patent: Jul. 2, 2002

(54) METHOD FOR DISPLAYING STATE OF MULTI-OPTICAL-AXIS PHOTOSWITCH AND MULTI-OPTICAL-AXIS PHOTOSWITCH ADAPTED TO THE METHOD

(75) Inventors: Akiji Yamaguchi; Keisuke Murakami; Toshio Okada, all of Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 09/323,929

(22) Filed: Jun. 2, 1999

(30) Foreign Application Priority Data

Jun. 2, 1998 (JP) .......................................... 10-153197

(51) Int. Cl.[7] .............................................. G08B 5/00
(52) U.S. Cl. .................... 340/815.4; 340/555; 250/221; 250/222.1
(58) Field of Search ........................ 340/815.4, 815.45, 340/815.43, 815.46; 250/221, 222.1

(56) References Cited

U.S. PATENT DOCUMENTS

| 3,947,722 | A | * | 3/1976 | Strom et al. ................ 313/582 |
| 4,356,393 | A | * | 10/1982 | Fayfield ...................... 250/221 |
| 4,553,838 | A | * | 11/1985 | Madsen ...................... 250/563 |
| 4,644,341 | A | | 2/1987 | Warner ................... 340/815.31 |
| 4,797,556 | A | * | 1/1989 | Marzari et al. ............. 250/551 |
| 4,851,660 | A | * | 7/1989 | Juds et al. .................. 250/214 |
| 4,965,548 | A | * | 10/1990 | Fayfield ...................... 340/511 |
| 5,039,978 | A | * | 8/1991 | Kronberg .................. 340/384.1 |
| 5,130,532 | A | | 7/1992 | Clemens ..................... 250/221 |
| 5,266,810 | A | | 11/1993 | Murphy ...................... 250/560 |
| 5,450,301 | A | * | 9/1995 | Waltz et al. ................ 362/231 |
| 5,621,205 | A | * | 4/1997 | Warner et al. .............. 250/205 |
| 6,011,467 | A | * | 1/2000 | Kamei et al. ............... 340/540 |
| 6,094,272 | A | * | 7/2000 | Okamoto .................... 250/226 |
| 6,124,936 | A | * | 9/2000 | Okamoto .................... 250/226 |
| 6,211,784 | B1 | * | 4/2001 | Nishide ..................... 340/568.1 |
| 6,236,036 | B1 | * | 5/2001 | Kudo et al. ................. 250/221 |
| 6,239,423 | B1 | * | 5/2001 | Hama et al. ................ 250/221 |

FOREIGN PATENT DOCUMENTS

| EP | 0 369 386 | 5/1990 |
| EP | 0 598 630 | 5/1994 |

* cited by examiner

Primary Examiner—Nina Tong
(74) Attorney, Agent, or Firm—Morgan, Lewis & Bockius LLP

(57) ABSTRACT

A multi-optical-axis photoswitch incorporating a light emitting unit and a light receiving unit between which a multiplicity of optical axes exist. In the multi-optical-axis photoswitch, the ratio of the number of optical axes in which the quantity of received light exceeds a predetermined threshold value with respect to the number of all of optical axes is displayed by a plurality of display lamps disposed concentrically, in particular, by a bar graph. Thus, the operation can be indicated such that movement must be performed in a direction in which the value of the bar graph is increased.

12 Claims, 15 Drawing Sheets

FIG. 7 (a)

| WHEN QUANTITY OF RECEIVED LIGHT IS INSUFFICIENT (INSTABLE INCIDENCE) | ALL OF LEDS ARE BLINKED IN GREEN (BOTH OF LIGHT EMITTING UNIT AND LIGHT RECEIVING UNIT) |
|---|---|
| WHEN DISTURBANCE LIGHT IS DETECTED | REPETITION OF ALTERNATION: ALL OF LEDS ARE TURNED ON IN GREEN; AND TWO LEDS AT UPPER AND LOWER POSITIONS ARE TURNED ON IN RED (BOTH OF LIGHT EMITTING UNIT AND LIGHT RECEIVING UNIT) |
| WHEN ABNORMAL CONDITION OF LIGHT EMITTING UNIT IS DETECTED | LIGHT EMITTING UNIT: ALL OF LEDS ARE BLINKED IN RED OR TRUNED OFF LIGHT RECEIVING UNIT: ALL OF LEDS ARE BLINKED IN RED |
| WHEN ABNORMAL CONDITION OF LIGHT RECEIVING UNIT IS DETECTED | LIGHT EMITTING UNIT: ALL OF LEDS ARE BLINKED IN RED LIGHT RECEIVING UNIT: ALL OF LEDS ARE BLINKED IN RED OR TURNED OFF |
| WHEN ANOTHER ABNORMAL CONDITION IS DETECTED | ALL OF LEDS ARE BLINKED IN RED (BOTH OF LIGHT EMITTING UNIT AND LIGHT RECEIVING UNIT) |

FIG. 7 (b)

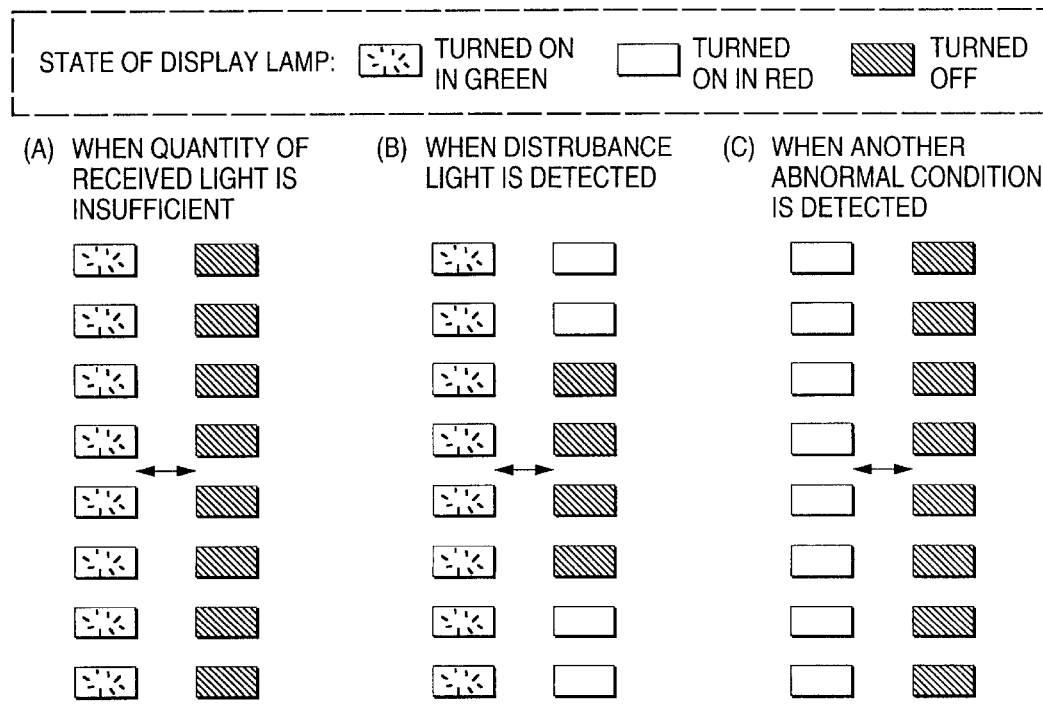

FIG. 13 (a)
| (A) | (B) | (C) | (D) |
|---|---|---|---|
| BAR GRAPH DISPLAY | CIRCULAR GRAPH DISPLAY | NUMERIC DISPLAY | CHARACTER DISPLAY |
|  | 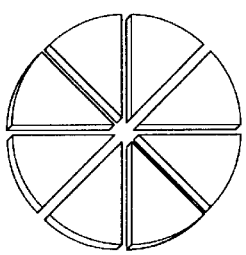 |  | 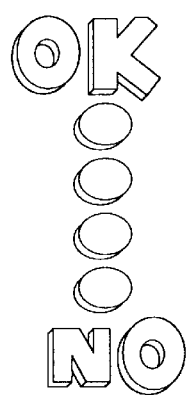 |

FIG. 13 (b)

| STATE | PANEL | (A)<br>BAR GRAPH DISPLAY | (B)<br>CIRCULAR GRAPH DISPLAY | (C)<br>NUMERIC DISPLAY | (D)<br>CHARACTER DISPLAY |
|---|---|---|---|---|---|
| NORMAL STATE | LIGHT MADE INCIDENT ON ALL OF OPTICAL AXES | ALL LAMPS ARE TURNED ON IN GREEN | ALL LAMPS ARE TURNED ON IN GREEN | ALL LAMPS ARE TURNED ON IN GREEN | OK LAMP IS TURNED ON IN GREEN |
| | PORTION OF OPTICAL AXES SHIELEDED | RATIO IS DISPLAYED IN RED FROM LOWEST LAMP | RATIO IS DISPLAYED IN RED | RATIO IS DISPLAYED IN RED FROM 0 | RATIO IS DISPLAYED IN RED FROM NO |
| | INSUFFICIENT QUANTITY OF RECEIVED LIGHT | ALL LAMPS ARE BLINKED IN GREEN | ALL LAMPS ARE BLINKED IN GREEN | ALL LAMPS ARE BLINKED IN GREEN | ALL LAMPS ARE BLINKED IN GREEN EXCEPT FOR NO |
| ABNORMAL STATE | DISTURBANCE LIGHT RECEIVED | REPETITION OF ALTERNATION: PORTION IS TURNED ON IN RED AND OTHER LAMPS ARE TURNED OFF; AND ALL LAMPS ARE TURNED ON IN GREEN | REPETITION OF ALTERNATION: PORTION IS TURNED ON IN RED AND OTHER LAMPS ARE TURNED OFF; AND ALL LAMPS ARE TURNED ON IN GREEN | REPETITION OF ALTERNATION: PORTION IS TURNED ON IN RED AND OTHER LAMPS ARE TURNED OFF; AND ALL LAMPS ARE TURNED ON IN GREEN | REPETITION OF ALTERNATION: PORTION IS TURNED ON IN RED AND OTHER LAMPS ARE TURNED OFF; AND ALL LAMPS ARE TURNED ON IN GREEN |
| | OTHER ABNORMAL STATE | ALL LAMPS ARE BLINKED IN RED | ALL LAMPS ARE BLINKED IN RED | ALL LAMPS ARE BLINKED IN RED | ALL LAMPS ARE BLINKED IN RED EXCEPT FOR OK |

METHOD FOR DISPLAYING STATE OF MULTI-OPTICAL-AXIS PHOTOSWITCH AND MULTI-OPTICAL-AXIS PHOTOSWITCH ADAPTED TO THE METHOD

BACKGROUND OF THE INVENTION

1. Field of the Invention

The present invention relates to a multi-optical-axis photoswitch incorporating a light emitting unit and a light receiving unit between which a multiplicity of optical axes exist which are realized by pairs of light emitting devices and light receiving devices in a detection area thereof, and more particularly to a state display method for displaying a light shielding state or the like of the multi-optical-axis photoswitch and a multi-optical-axis photoswitch adapted to the method.

2. Description of the Related Art

The multi-optical-axis photoswitch is a switch having a plurality of optical axes formed by pairs of light emitting devices of a light emitting unit and light receiving devices of a light receiving unit and arranged to be operated when any one of the optical axes is shielded by an object. Hitherto, the multi-optical-axis photoswitch has been known as an "optical area sensor" which is capable of detecting existence of an object in a wide detection area. The multi-optical-axis photoswitch is used to improve safety of an operator of a machine tool, a punching machine, a pressing machine, a controller, a molding machine, an automatic controller, a winding machine, a robot, a casting machine or the like. The foregoing multi-optical-axis photoswitch is disposed in a dangerous region for a pressing machine or the like to form a detection area and to detect shielding of an optical axis which is caused when a portion of the body of an operator, for example, the finger or the hand of the operator, enters the detection area. Thus, the operation of the machine is interrupted or an alarm is issued to protect the operator.

Further, the multi-optical-axis photoswitches are disposed along automatic manufacturing lines in a plant to detect existence of moving articles. Thus, the multi-optical-axis photoswitches are employed as sensors in an automatic control system with which a next step is started if an article is detected.

A multi-optical-axis photoswitch of the foregoing type, as shown in FIG. 8, incorporates a light emitting unit 2 constituted by disposing a plurality of (eight in the structure shown in FIG. 8) light emitting devices 21, such as light emitting diodes (LED) which emit infrared rays, at predetermined pitches. Moreover, the multi-optical-axis photoswitch incorporates a light receiving unit 3 constituted by disposing light receiving devices 31, such as photodiodes, at predetermined pitches to correspond to the light emitting devices 21 in order to receive optical axes 5 which are infrared beams emitted from the light emitting devices 21 of the light emitting unit 2. The light emitting unit 2 is disposed at one end of a detection area which is provided for a pressing machine or the like and which must be protected. On the other hand, the light receiving unit 3 is disposed at the other end of the detection area such that the light emitting unit 2 and the light receiving unit 3 are disposed opposite to each other. Light beams are emitted and received between the pairs of the light emitting devices and the light receiving devices of the light emitting unit 2 and the light receiving unit 3. Thus, whether or not each light beam is shielded is detected. The light emitting unit 2 and the light receiving unit 3 are connected to each other through a signal line 8.

The light emitting unit 2 is controlled by a light-emitting-unit control circuit so that the light emitting devices 21 of the light emitting unit 2 sequentially and cyclically emit light from one end of the light emitting devices 21 to the other end of the same (for example, in an upward direction from the lowest device). In synchronization with the light receiving devices 31 of the light receiving unit 3 corresponding to the light emitting devices 21, only the corresponding light receiving device 31 is enabled to receive light and the other light receiving devices 31 are made to be impossible to receive light. The reason why only one light receiving device 31 is always enabled to receive light lies in that light emitted from a light emitting device 21 is not always received by only a corresponding light receiving device 31. Therefore, a case can be considered that relatively intense light is made incident on also light receiving devices 31 adjacent to the correspond light receiving device 31. That is, the structure is formed such that light receipt signals from all of the light receiving devices 31 are collectively supplied to one binarizing circuit. Therefore, even if one optical axis is shielded because of introduction of an object, light made incident on the adjacent light receiving devices 31 causes the overall intensity level of light to exceed a threshold value. Thus, an incorrect determination is made that the state is a state in which light can be received. Thus, introduction of an object cannot accurately be detected.

Only one optical axis is cyclically and always made to be effective as described above to continue detection. If an object or fingers or hand of a human being is introduced into the detection area, an optical axis 5 at that position is shielded. Thus, the light receiving device 31 cannot receive light. Therefore, an alarm is issued or the operation of the machine is interrupted to improve safety.

FIG. 9 is a block diagram showing a sensor portion of the multi-optical-axis photoswitch 1 shown in FIG. 8. The multi-optical-axis photoswitch 1 is composed of the light emitting unit 2 and the light receiving unit 3.

The light emitting unit 2 incorporates N light emitting devices 21 (211, 212 to 21N) disposed at required pitches, for example 40 mm and comprising light emitting diodes or the like, N being a required number. Moreover, the light emitting unit 2 incorporates N light emitting circuits 22 (221, 222 to 22N) for operating the light emitting devices 21; a light-emitting-device switching circuit 23 to scan the N light emitting circuits 22 in a time division manner; a light-emitting-unit control circuit 24; and a display unit 6 for displaying a state of the multi-optical-axis photoswitch 1.

The light-emitting-unit control circuit 24 employs a gate array in this case to perform control. As a matter of course, another control device, for example, a CPU, may be employed in place of the gate array.

If the display unit 6 is composed of one display lamp which displays, for example, red and green light, green light is displayed when all of the optical axes are ensured. In the other cases, red light is displayed. If a monochrome display lamp is employed, the lamp is turned on when all of the optical axes are ensured. In the other cases, the lamp is turned off.

The light receiving unit 3 incorporates N light receiving devices 31 (311, 312 to 31N) disposed at the same pitch as that in the light emitting unit and comprising phototransistors or the like, N being a required number. Moreover, the light receiving unit 3 incorporates N light receiving circuits 32 (321, 322 to 32N) for I–V converting light receipt signal from each of the light receiving devices 31; and a light-receiving-device switching circuit 33 for scanning the N light receiving circuits 32 in a time division manner in synchronization with the light emitting devices 21 forming pairs with the N light receiving circuits 32. In addition, the light receiving unit 3 incorporates an amplifying circuit 361 for collectively amplifying light receipt signals from the light receiving circuits 32; and a binarizing circuit 362 for converting the amplified signals into 1 or 0 with respect to a predetermined threshold value. Moreover, the light receiving unit 3 incorporates a detection circuit 363 for determining a state of incident light by using the binarized signal; a light-receiving-unit control circuit 34 for controlling the light receiving unit 3; and an output circuit 35 for interrupting the operation of the pressing machine or the like.

The light-receiving-unit control circuit 34 employs a gate array similarly to the light-emitting-unit control circuit 24. As a matter of course, another control device, for example, a CPU, may be employed in place of the gate array.

The structure shown in FIG. 9 is formed such that the display unit is provided for the light receiving unit 3 and the same is omitted from the light emitting unit 2. Depending on a state of use, a display unit may be provided for the light emitting unit 2 in place of the display unit 6 provided for the light receiving unit 3.

The signal line 8 is provided for supplying a synchronizing signal for synchronization between the light emitting unit 2 and the light receiving unit 3 from the light receiving unit 3 to the light emitting unit 2.

Moreover, a light emission/receipt monitoring circuit (not shown) is provided for each of the light emitting unit 2 and the light receiving unit 3. Thus, whether or not each of the light emitting devices and light receiving devices is being operated normally is always monitored. When an abnormal condition, such as a breakdown of the device, occurs, an alarm can quickly be issued to the operator.

The state of the operation of a multi-optical-axis photoswitch of the foregoing type has been displayed by the following three methods:

(1) A first method of displaying an operation state uses one display unit 6, as shown in FIG. 10. When all of the optical axes are ensured, the display unit emits green light. In the other cases, that is, in cases where one or more optical axes are shielded, the display unit 6 is turned off (or red light is emitted).

(2) A second method of displaying an operation state uses a plurality of display units 6 as shown in FIG. 11. That is, one display unit is disposed adjacently to each of the light emitting devices 21 so as to display the operation state.

(3) A third method of displaying an operation state has a structure that one display unit is blinked to display the operation state. That is, the blinking rate is changed to display a ratio of the number of optical axes through which light passes. In this method, 1) If light passes through one optical axis, the display unit is blinked at intervals of 3/10 second.

2) If light passes through four optical axes, the display unit is blinked at intervals of 1/10 second.

3) If light passes through seven optical axes, the display unit is blinked at intervals of 1/20 second.

However, the above-mentioned conventional examples have the following problems:

(1) In the case of the first method, adjustment of the optical axis from the light emitting unit to the light receiving unit cannot conveniently be performed. That is, the display unit continues the state in which it is turned off (or emits red light) if all of the optical axes are not ensured. Therefore, even if the light emitting unit (or the light receiving unit) is moved vertically and horizontally with respect to a plane made by the light receiving unit (or the light emitting unit) during the optical axis adjustment, the display unit continues the state in which it is turned on (or emits red light) unless all of the optical axes are ensured. As a result, there arises a problem that a correct direction of movement cannot be determined.

(2) In the case of the second method, the inconsistent optical axis can immediately be detected. However, all of the display units must be observed from one end display unit to the other end display unit of the light receiving unit (or the light emitting unit) to detect whether or not the number of optical axes through which light passes has increased when the light emitting unit (or the light receiving unit) is moved. Therefore, satisfactory visibility cannot be obtained. What is worse, each light axis must be provided with the display unit. Therefore, the overall size cannot be reduced, causing the cost to be enlarged. Therefore, there arises a problem that the number of elements other than original elements increases.

(3) In the case of the third method, adjustment of the optical axes cannot conveniently be performed. This method enables only the ratio of optical axes through which light passes to be detected in accordance with an absolute blinking rate. Information about a direction in which the optical axis must be moved cannot be obtained. That is, the direction into which the movement must be performed is detected in accordance with change in the blinking rate occurring when movement in which direction has been performed. To detect change in the blinking rate, the blinking rate must be counted for a predetermined time. Therefore, the direction into which the movement must be performed cannot instantaneously be detected. What is worse, thorough knowledge of the blinking rate with respect to the ratio of the number of the optical axes through which light passes is required to adjust the optical axes. Therefore, a beginner cannot easily perform the adjustment.

SUMMARY OF THE INVENTION

Accordingly, the present invention is arranged to solve the above-mentioned problems by displaying a state in the form of a bar graph. According to the present invention, adjustment of optical axes can be performed by performing movement in a direction in which the value of the bar graph increases. Thus, adjustment of the optical axes can easily be performed. As a result, a beginner is able to easily adjust the optical axes. Since display lamps are concentrically disposed, the bar graph can immediately be recognized. Since the necessity required for the conventional structure (2) to observe the overall area of the light emitting unit can be eliminated, the visibility of the display of the state can be improved. An object of the present invention is to provide such a display method and a multi-optical-axis photoswitch.

To achieve the above-mentioned object, according to an aspect of the present invention, there is provided a state displaying method for displaying a state of a multi-optical-axis photoswitch which incorporates a light emitting unit and a light receiving unit between which a multiplicity of optical axes exist which are realized by pairs of emitted light and received light, the method comprising the steps of:

calculating a ratio of the number of optical axes in which a quantity of received light has exceeded a predetermined threshold value with respect to the number of all of the optical axes; and causing a plurality of display lamps disposed concentrically to display the calculated ratio.

According to another aspect of the present invention, there is provided a multi-optical-axis photoswitch incorporating a light emitting unit and a light receiving unit between which a multiplicity of optical axes exist which are realized by pairs of emitted light and received light, the photoswitch comprising: a counter for counting the number of optical axes in which a quantity of received light has exceeded a predetermined threshold value; displaying means including a plurality of display lamps disposed concentrically; calculating means for calculating a ratio of the number of optical axes counted by the counter with respect to the number of all of the optical axes; and display control means for controlling the plural display lamps to display a result of a calculation performed by the calculating means as a bar graph.

BRIEF DESCRIPTION OF THE DRAWINGS

FIG. 7(a) is a table showing an example of alarms which are issued in an abnormal state of display shown in FIG. 6.

FIG. 7(b) is a diagram showing the same.

FIG. 13(a) is an illustration showing a variety of examples of structures of concentrated disposition of a plurality of display lamps according to a third embodiment of the present invention.

FIG. 13(b) is a table showing methods of display of states.

DETAILED DESCRIPTION OF THE PREFERRED EMBODIMENTS

A first embodiment of the present invention will now be described with reference to FIGS. 1(a) to 7(b).

FIGS. 1(a) and 1(b) are overall perspective views showing bar graph display units of multi-optical-axis photoswitches according to the first embodiment of the present invention.

Figure 1:
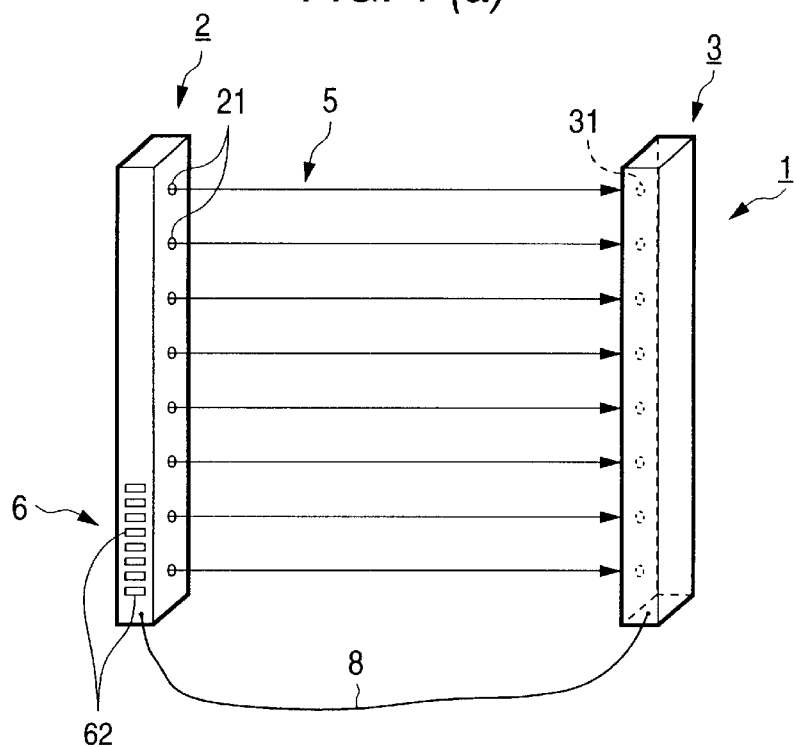
FIGS. 1(a) and 1(b) are overall perspective views showing multi-optical-axis photoswitches according to a first embodiment of the present invention.
Figure 1:
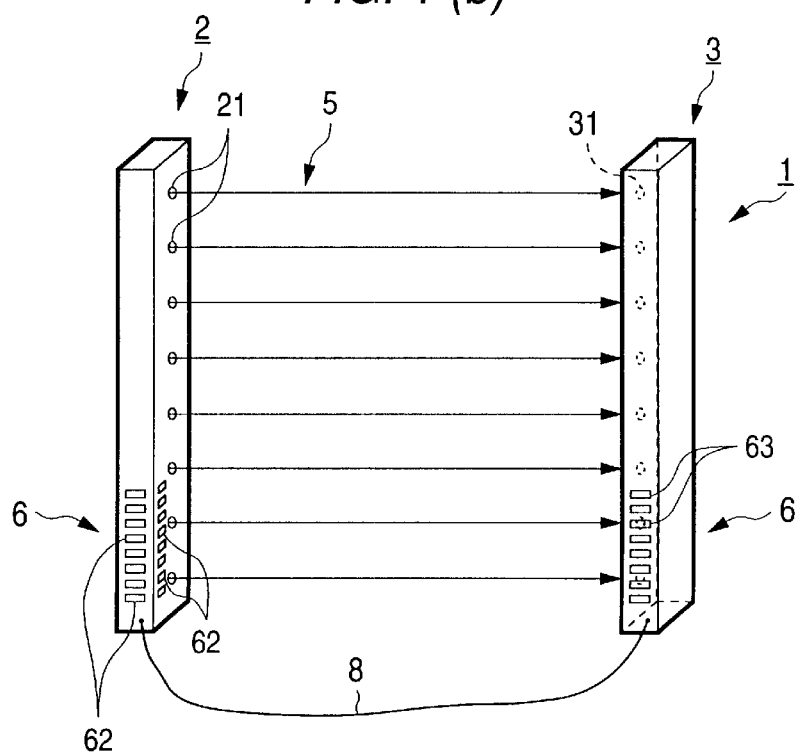
Figure 2:
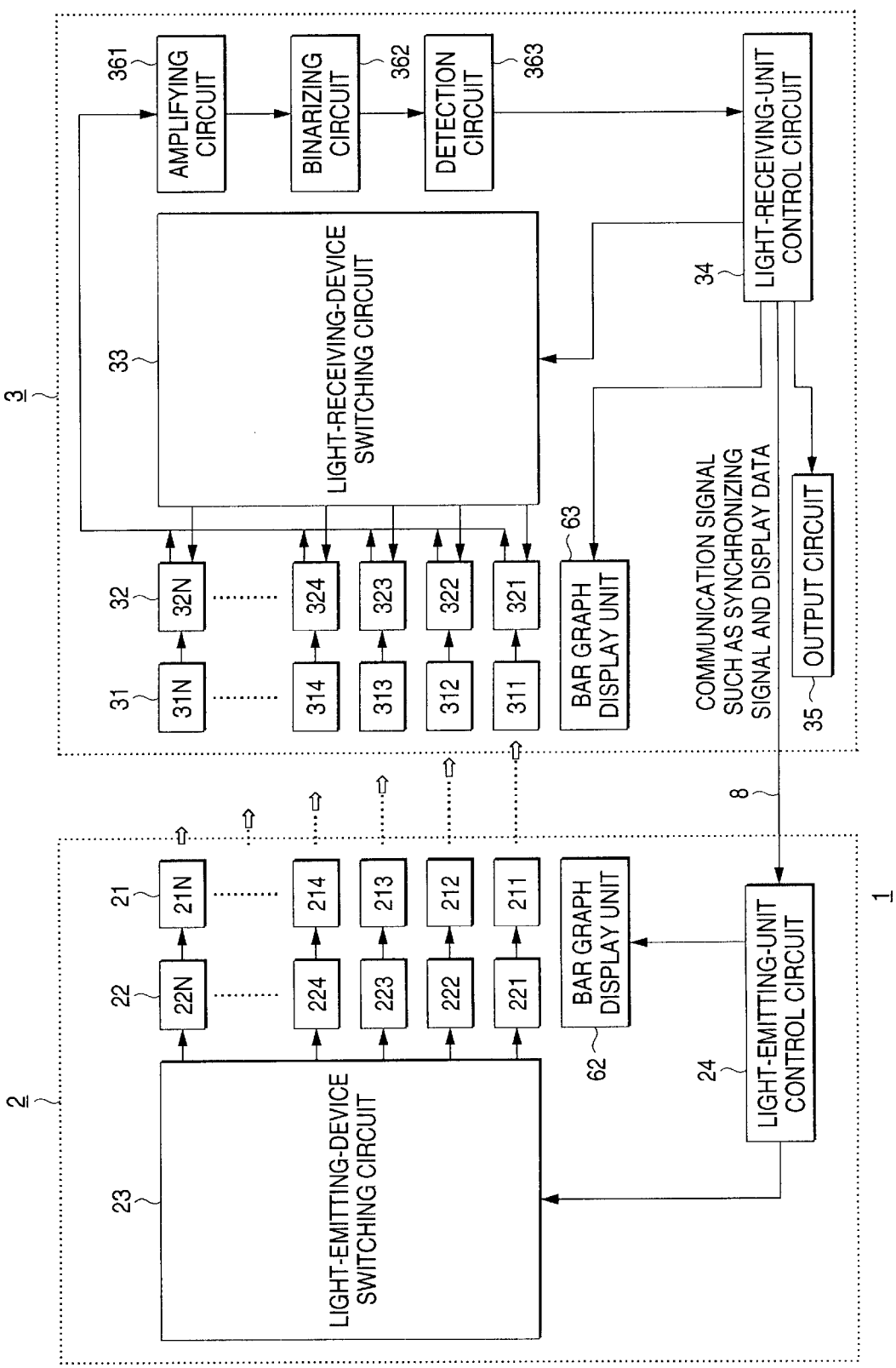
FIG. 2 is a block diagram showing a sensor portion of the multi-optical-axis photoswitch according to the present invention.

FIG. 2 is a block diagram showing a sensor portion of the multi-optical-axis photoswitch according to the present invention.

Figure 3:
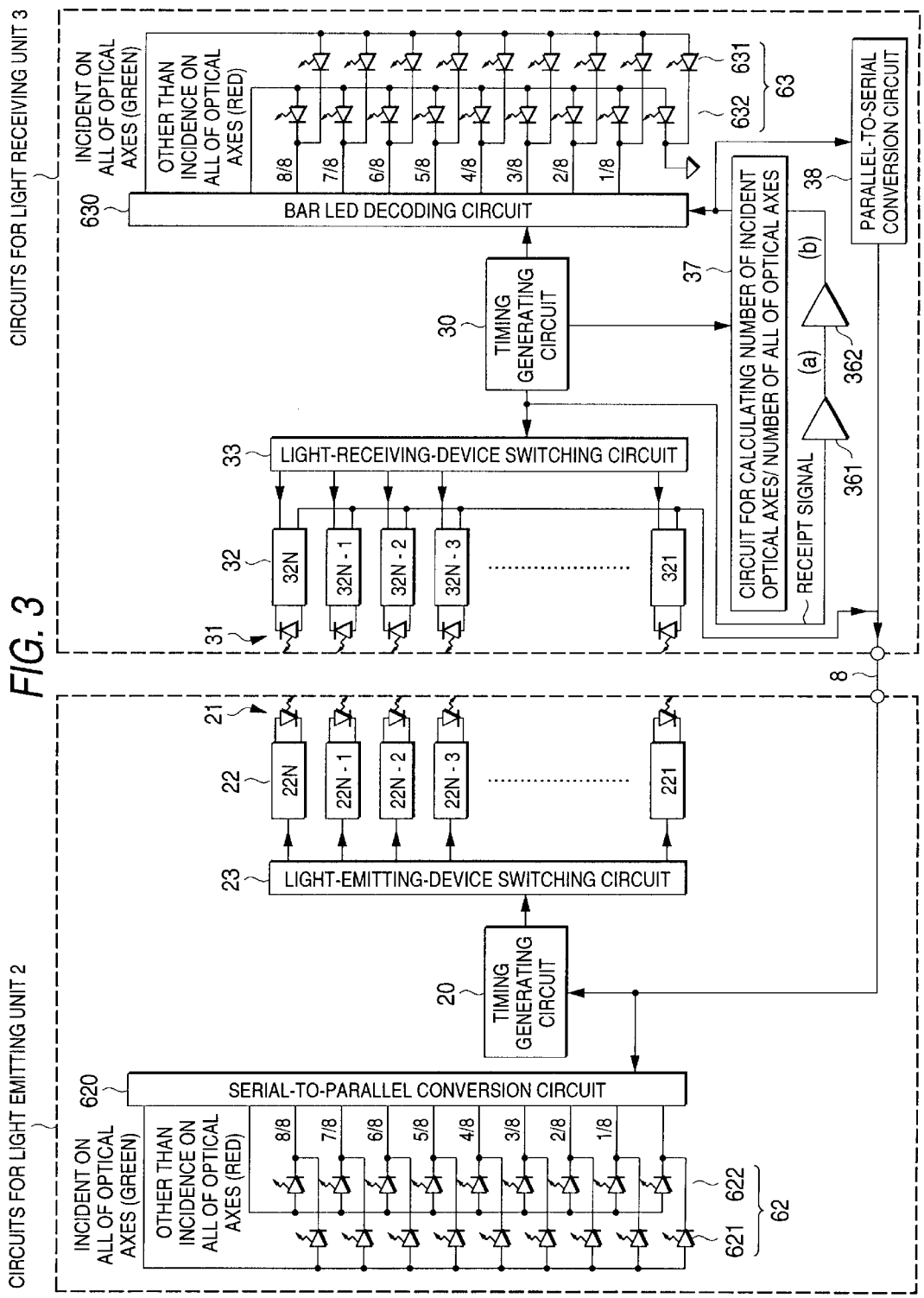
FIG. 3 is a circuit diagram showing blocks of a light-emitting-device control circuit, a light-receiving-device control circuit and bar graph display units shown in FIG. 2.

FIG. 3 is a block diagram showing the bar graph display unit shown in FIG. 2.

Figure 4:
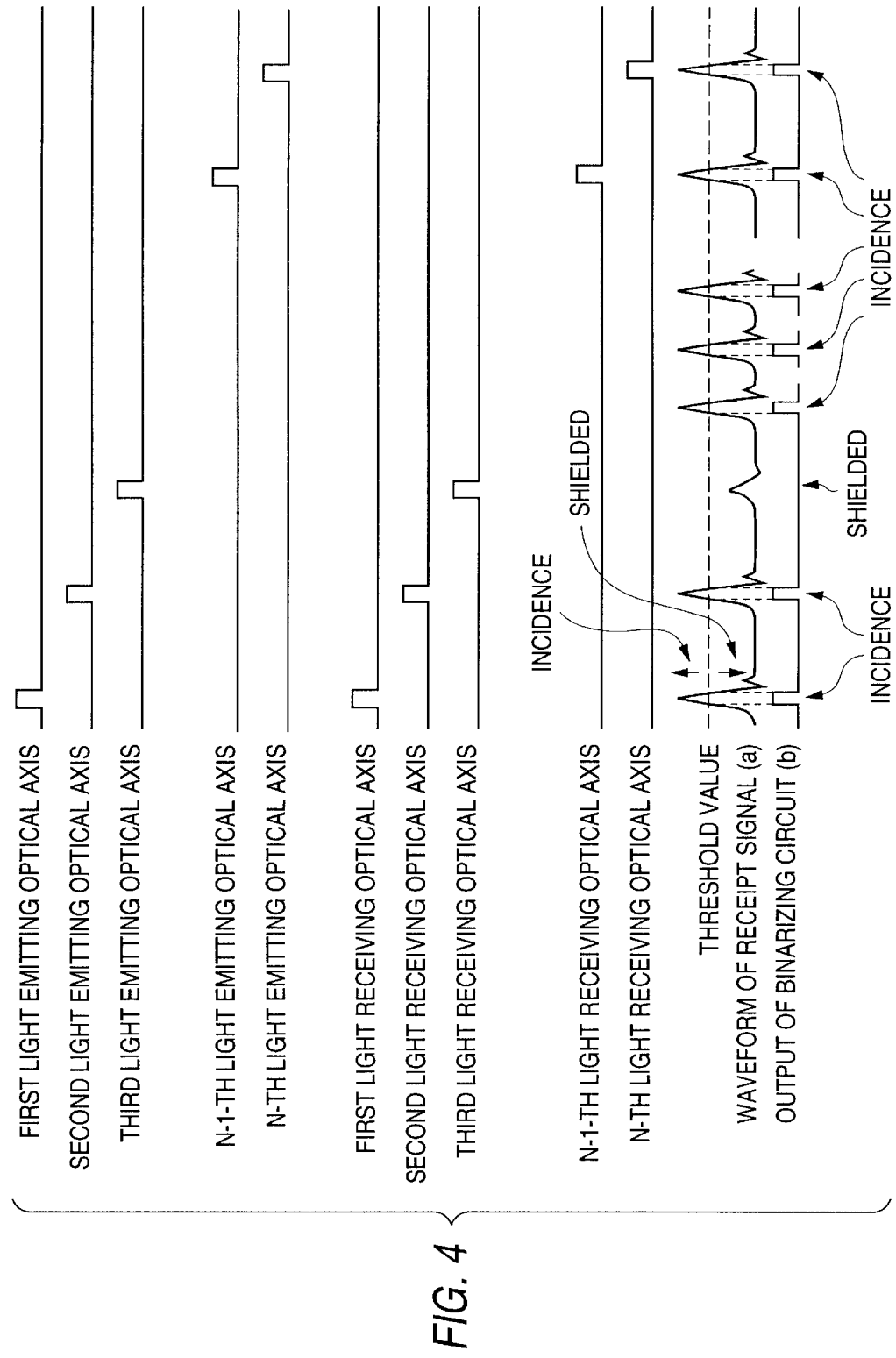
FIG. 4 is a timing chart of an essential portion of the multi-optical-axis photoswitch shown in FIG. 3.

FIG. 4 is a timing chart of an essential portion of the multi-optical-axis photoswitch shown in FIG. 3.

Figure 5:
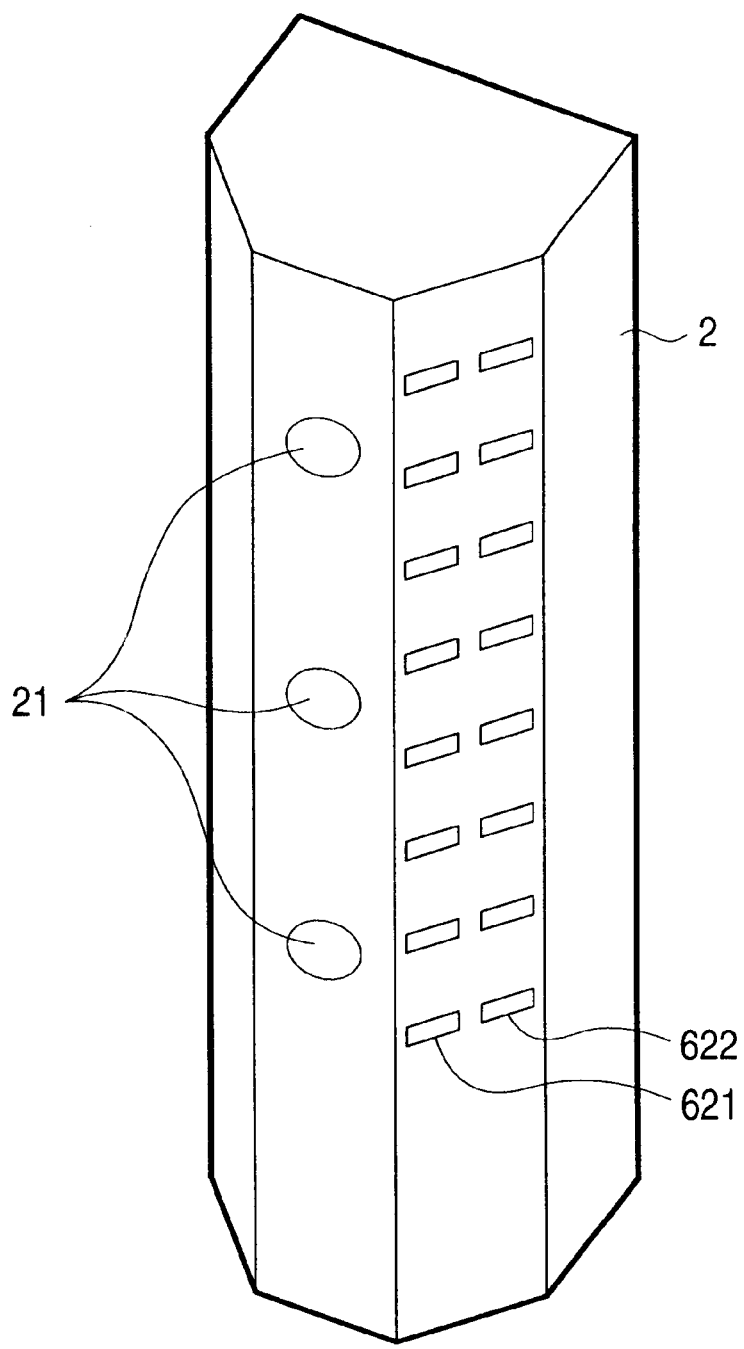
FIG. 5 is an enlarged perspective view showing an example of a bar graph display unit in the present invention.

FIG. 5 is an enlarged perspective view showing an example of the bar graph display unit in the present invention.

Figure 6:
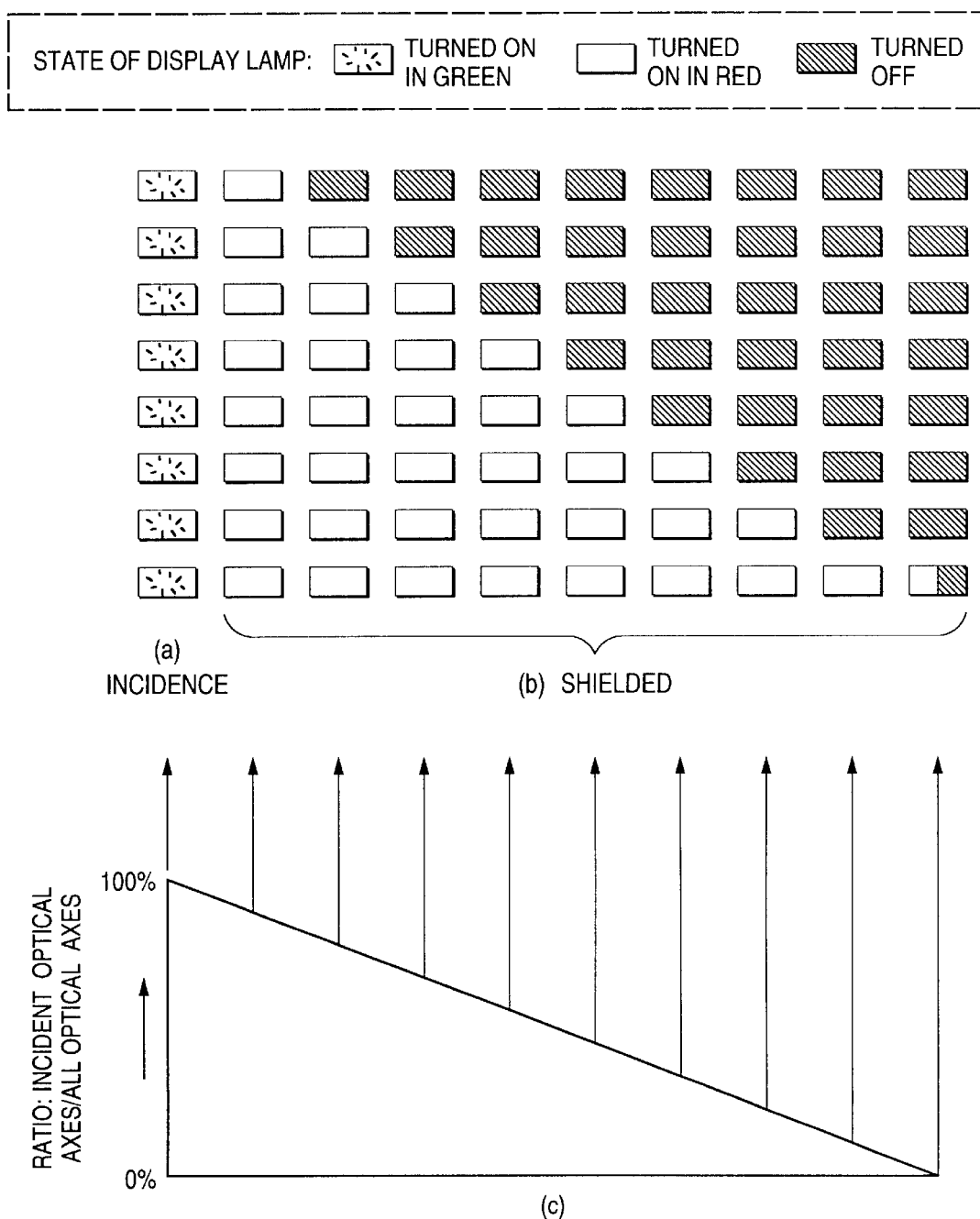
FIG. 6 is a diagram showing an example of display of a normal state performed by the bar graph display unit shown in FIG. 3.
Figure 8:
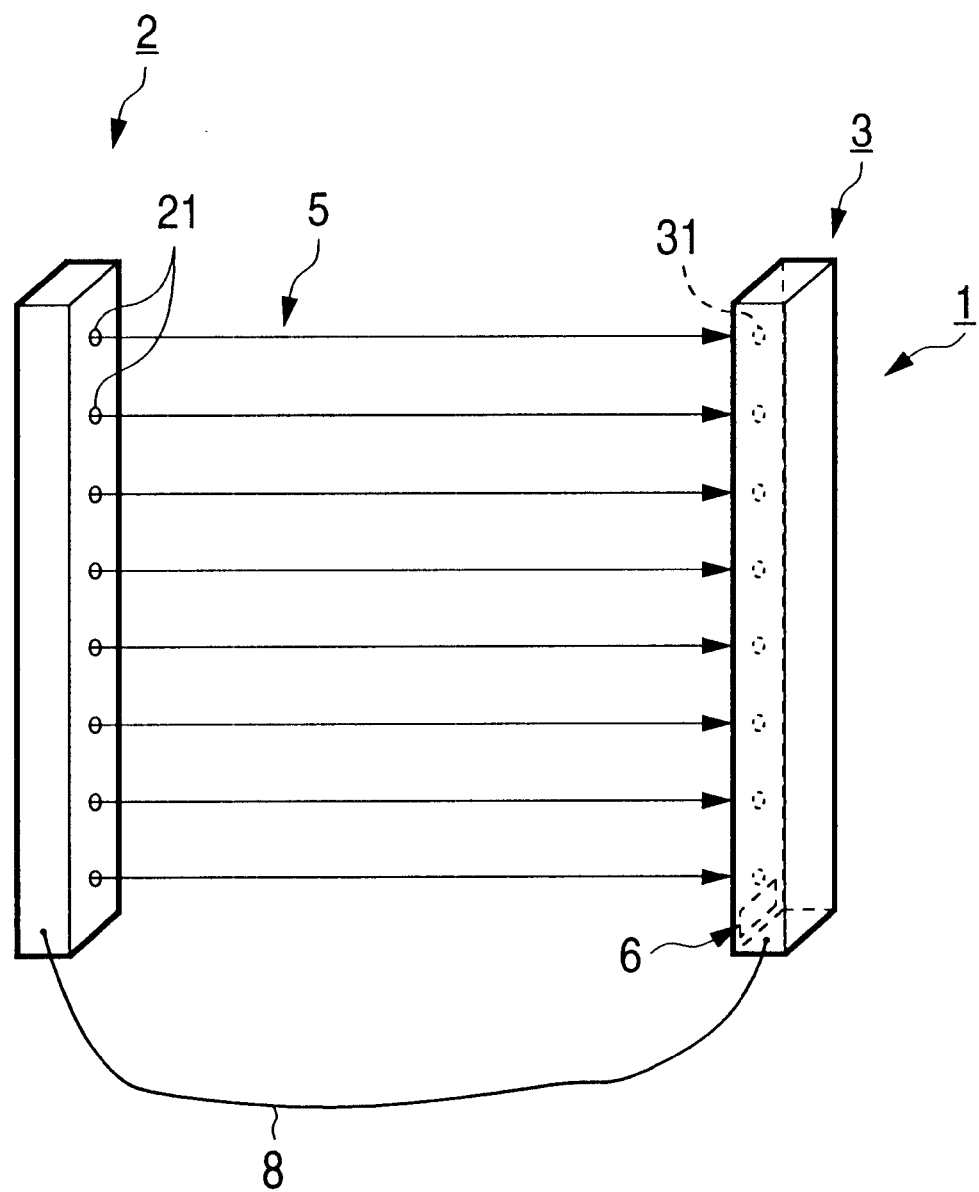
FIG. 8 is an overall perspective view showing a conventional multi-optical-axis photoswitch.
Figure 9:
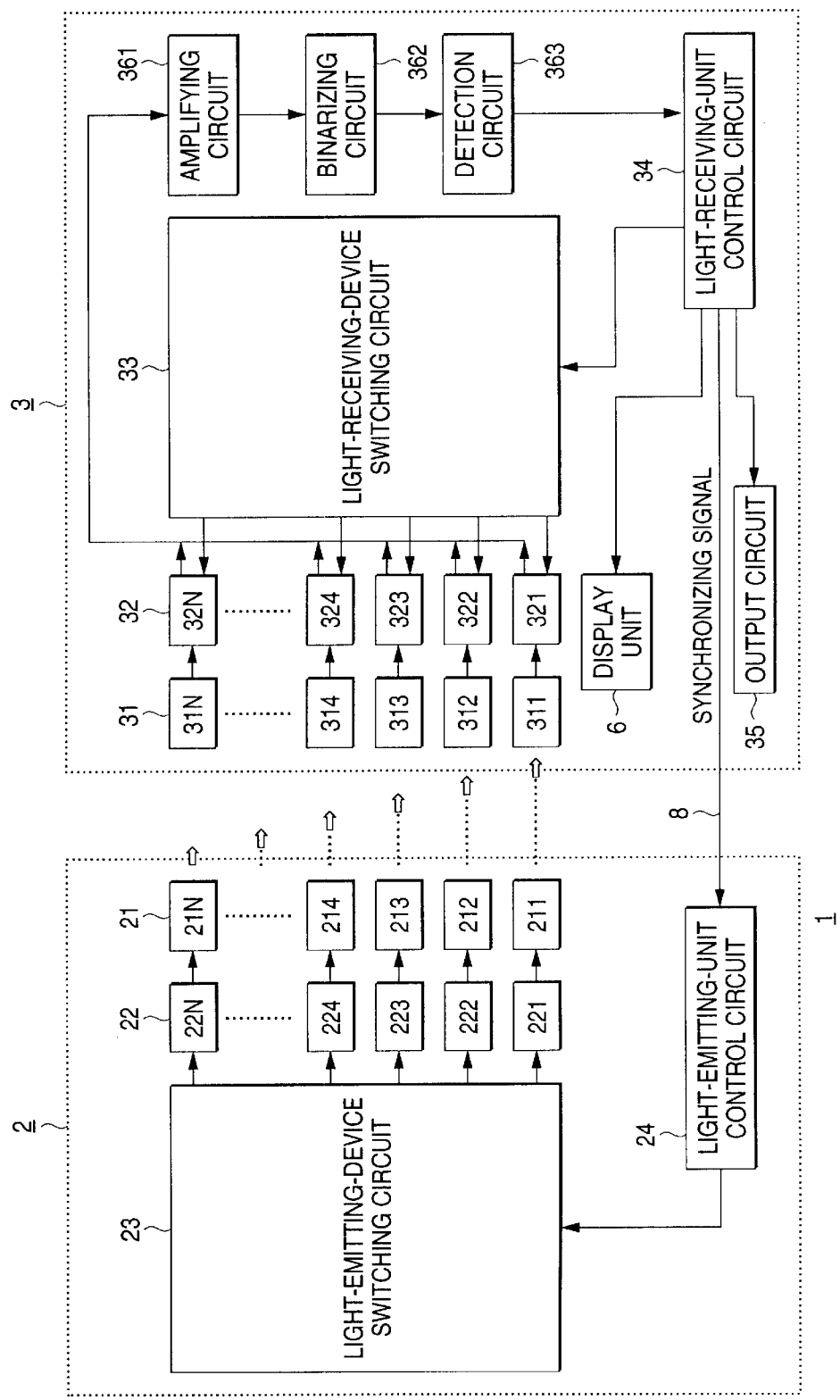
FIG. 9 is a block diagram showing a sensor portion of the conventional multi-optical-axis photoswitch.
Figure 10:
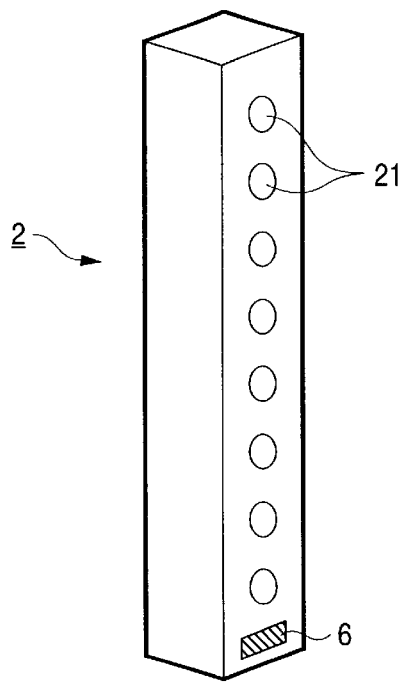
FIG. 10 is a diagram showing a conventional multi-optical-axis photoswitch having one display lamp.
Figure 11:
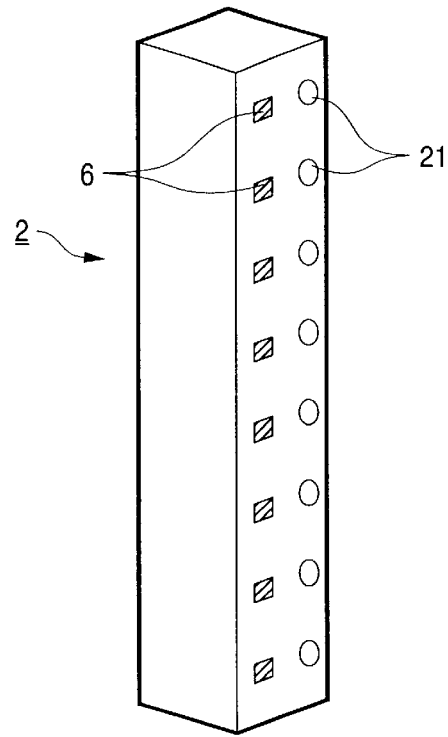
FIG. 11 is a diagram showing a conventional multi-optical-axis photoswitch having a plurality of display lamps.

FIG. 6 is a diagram showing an example of display of a usual state on the bar graph display unit shown in FIG. 3.

FIG. 7(a) is a table showing an example of display of alarms shown in FIG. 6 which are issued under abnormal conditions.

FIG. 7(b) is a diagram showing the same.

FIG. 1(a) shows an example in which a bar graph display unit is provided only for one of a light emitting unit and a light receiving unit. In this example, the bar graph display unit is provided for the light emitting unit. Reference numeral 1 designates a multi-optical-axis photoswitch (an area sensor) having eight optical axes and incorporating a bar graph display unit so as to detect an object in a detection area thereof. Reference numeral 2 designates a light emitting unit of the multi-optical-axis photoswitch 1. Reference numeral 3 designates a light receiving unit arranged to receive optical axes formed from the light emitting devices 21 of the light emitting unit 2 by corresponding light receiving devices 31 thereof. Reference numeral 6 designates a display unit which is a bar graph display unit comprising a plurality of (for example, eight) light emitting diode (LED) segments 62.

FIG. 1(b) shows an example in which bar graph display units 62 and 63 are provided for both of the light emitting unit 2 and the light receiving unit 3, respectively. Moreover, in this example, the bar graph display unit 62 is provided for each of two side surfaces of the left light emitting unit 2. In FIG. 1(b), the light emitting unit 2 and the light receiving unit 3 are disposed at the left-hand and right-hand positions. Therefore, the bar graph display units 62 and 63 are disposed at the front position and the side position. When the positions of the light emitting unit and the light receiving unit are rotated by an annular degree of 90° to vertically dispose the foregoing units, it is preferable that the bar graph display units 62 and 63 are disposed at positions at which the units can easily be recognized. Reference numeral 8 designates the communication line. When the multi-optical-axis photoswitch 1 shown in FIG. 1(b) is employed in a case where the horizontal (or vertical) detection area has a long length, convenience can be afforded.

FIG. 2 is a block diagram showing the multi-optical-axis photoswitch shown in FIG. 1(a) or 1(b).

Reference numeral 1 designates the multi-optical-axis photoswitch composed of the light emitting unit 2 and the light receiving unit 3. The light emitting unit 2 incorporates N light emitting devices 21 (211, 212 to 21N) disposed at required pitches, for example 40 mm and comprising light emitting diodes or the like, N being a required number. Moreover, the light emitting unit 2 incorporates N light emitting circuits 22 (221, 222 to 22N) for operating the light emitting devices 21; a light-emitting-device switching circuit 23 to scan the N light emitting circuits 22 in a time division manner; a light-emitting-unit control circuit 24; and a bar graph display unit 62 according to the present invention and capable of displaying a variety of states of the multi-optical-axis photoswitch 1.

The light receiving unit 3 incorporates N light receiving devices 31 (311, 312 to 31N) disposed at the same pitch as that in the light emitting unit and comprising phototransistors or the like, N being a required number. Moreover, the light receiving unit 3 incorporates N light receiving circuits 32 (321, 322 to 32N) for I–V converting light receipt signal from each of the light receiving devices 31; and a light-receiving-device switching circuit 33 for scanning the N light receiving circuits 32 in a time division manner in synchronization with the light emitting devices 21 forming pairs with the N light receiving circuits 32. In addition, the light receiving unit 3 incorporates an amplifying circuit 361 for collectively amplifying light receipt signals from the light receiving circuits 32; and a binarizing circuit 362 for converting the amplified signals into 1 or 0 with respect to a predetermined threshold value. Moreover, the light receiving unit 3 incorporates a detection circuit 363 for determining a state of incident light by using the binared signal; a light-receiving-unit control circuit 34 for controlling the light receiving unit 3; an output circuit 35 for interrupting the operation of the pressing machine or the like; and a bar graph display unit 63 according to the present invention and capable of displaying a variety of states of the multi-optical-axis photoswitch 1.

The light emitting unit 2 and the light receiving unit 3 are connected to each other through the signal line 8.

FIG. 3 is a circuit diagram showing the blocks of the light-emitting-unit control circuit 24, the light-receiving-device control circuit 34 and the bar graph display units 62 and 63.

Referring to FIG. 3, in a block for the light emitting unit 2, reference numeral 20 designates a timing generating circuit and 620 designates a serial-to-parallel conversion circuit for converting serial communication data to be described later. Serial communication data is data which is transmitted from the light receiving unit and which is used for the bar graph display unit.

The light-emitting-device control circuit 24 shown in FIG. 2 incorporates the serial-to-parallel conversion circuit 620 and the foregoing timing generating circuit 20. These circuits are realized by gate arrays. As a matter of course, the circuits may be realized by another control means, for example, a CPU. Reference numeral 62 designates the bar graph display unit according to the present invention, the bar graph display unit 62 being a unit which is controlled by the serial-to-parallel conversion circuit 620 and which comprises a green LED group 621 and a red LED group 622. Since the other circuits have been described with reference to FIG. 2, they are omitted from description here.

On the other hand, in a block for the light receiving unit 3, reference numeral 30 designates a timing generating circuit, 630 designates a bar LED decoding circuit and 63 designates the bar graph display unit comprising a green LED group 631 and a red LED group 632. Reference numeral 37 designates a circuit for calculating the number of incident optical axes/the number of all of optical axes and 38 designates a parallel-to-serial conversion circuit. The bar graph display unit 63 according to the present invention is turned on/off by the bar LED decoding circuit 630.

Since the other circuits have been described with reference to FIG. 2, they are omitted from description here.

The light-receiving-device control circuit 34 shown in FIG. 2 incorporates the timing generating circuit 30, the circuit 37 for calculating the number of incident optical axes/the number of all of optical axes, the parallel-to-serial conversion circuit 38 and the bar LED decoding circuit 630. Although the above-mentioned circuits are realized by gate arrays similarly to those of the light emitting unit, they may be realized by a CPU or the like.

The bar graph display units 62 and 63 shown in FIG. 3 and provided for the light emitting unit 2 and the light receiving unit 3 correspond to the structure shown in FIG. 1(b).

The actual configuration of the bar graph display unit is shown in FIG. 5. FIG. 5 is a perspective view showing an example of the bar graph display unit 62 shown in FIG. 3 and comprising the green LEDs 621 and the red LEDs 622. Referring to FIG. 5, the green LEDs 621 and the red LEDs 622 are concentrically disposed adjacently to the lower light emitting devices 21 of the light emitting unit 2 so that a bar graph is formed. A usual structure comprises eight green bar LEDs 621 and eight red LEDs 622 disposed in two parallel rows. The number of optical axes and that of the display bar LEDs are not limited particularly. The bar graph display unit may be provided for only the light emitting unit 2 or the light receiving unit 3 or both of the same. The positions and the number of the bar graph display units may be varied. For example, they may be provided for the two surfaces (side and front surfaces) of the light emitting unit 2 or the light receiving unit 3. If the light emitting unit 2 and the light receiving unit 3 are disposed apart from each other for a distance of 5 m or longer and thus visibility deteriorates, or if the visibility of either of the light emitting unit 2 or the light receiving unit 3 is unsatisfactory depending on the position of the light emitting unit 2 and the light receiving unit 3, the bar graph display units are provided for both of the light emitting unit 2 and the light receiving unit 3. Thus, the problem experienced with the conventional structure can be overcome.

Referring to FIGS. 2 to 4, the operation will now be described.

The basic operation will now be described. The light emitting devices 211 to N (see FIG. 2) of the light emitting unit 2 are caused to cyclically emit light in a scanning manner. Also the corresponding light receiving circuits 321 to N of the light receiving unit 3 are cyclically turned on in synchronization with light emitting timing to receive light in the scanning manner. Thus, shielding of light is detected. FIG. 4 is a timing chart showing the light emitting timing from the light emitting unit 2. Referring to FIG. 4, the light emitting timing from the light emitting unit 2 is arranged such that timing signals transmitted from the timing generating circuit 20 (see FIG. 3) are used so that signal waveforms of the first to N-th light emitting optical axes are generated. Thus, the light emitting devices 211 to N sequentially emit light in a scanning manner through the light-emitting-device switching circuit 23 (see FIGS. 2 and 3) and the light emitting circuits 221 to N.

The light receiving unit 3 is, from signals supplied from the timing generating circuit 30 (see FIG. 3), given the timing as indicated by the signal waveforms of the first light receiving optical axis to N-th light receiving optical axis shown in FIG. 4. Thus, the corresponding light receiving circuits 321 to N (see FIG. 2) of the light receiving devices 311 to N (see FIG. 2) are turned on in synchronization with the light emitting timing of the light emitting unit 2 so that light is received in the scanning manner. The synchronization between the timing generating circuit 20 of the light emitting unit 2 and the timing generating circuit 30 of the light receiving unit 3 is maintained by transmitting synchronization recognition pulse (a pattern) from the light receiving unit to the light emitting unit through the signal line 8. As a matter of course, another circuit structure may be employed if a similar timing process can be performed. For example, the structure may be formed mainly by software such that the light emitting unit 2 and the light receiving unit 3 are controlled by one CPU so as to easily and reliably perform the synchronizing process by using one timer. In any case, an electrical synchronizing signal is transmitted through the signal line 8.

If the display of the bar graph is provided for only the light receiving portion and it is omitted from the light emitting portion, an optical burst signal may be transmitted. In this case, the signal line 8 between the light emitting portion and the light receiving portion can be omitted.

Signals received by the light receiving unit 3 are detected such that analog outputs (a) amplified by the amplifying circuit 361 for each of the first to N-th optical axes are subjected to comparisons with a threshold value in the binarizing circuit 362. If the level of the received signal exceeds the threshold value, a determination is made that light has been received. Thus, an output of a pulse (b) is produced. If the level is not higher than the threshold value, a determination is made that light has been shielded.

The thus binarized incident signal (b) is supplied to the circuit 37 for calculating the number of incident optical axes/the number of all of optical axes so that the number of optical axes in which the quantity of received light has exceeded the predetermined threshold value is counted. Thus, the ratio of the number of the incident optical axes with respect to the number of all of the optical axes (which is eight in this embodiment) is calculated. In accordance with the calculated ratio of the number of the incident optical axes, the corresponding display lamps are displayed as the bar graph. Therefore, display data for the bar graph display unit 63 is obtained by decoding which is performed by the bar LED decoding circuit 630. Thus, the bar graph display unit 63 of the light receiving unit is turned on.

To display the bar graph on the bar graph display unit 62, same display data is converted into serial communication data through the parallel-to-serial conversion circuit 38, and then transmitted to the light emitting unit through the signal line 8. In the light emitting unit, the serial communication data is again converted into parallel data by the serial-to-parallel conversion circuit 620 so that the bar graph display unit 62 of the light emitting unit 2 is turned on.

Contents of display data which is obtained by the decoding circuit 630 will now be described.

In a usual case, the bar graph display units 62 and 63 perform display as shown in FIGS. 6(a) and 6(b) such that green light, red light and blinking are used to display the following contents in accordance with the ratios of 0% to 100% obtained by the circuit 37 for calculating the number of incident optical axes/the number of all of optical axes shown in FIG. 6(c).

1. When the incidence ratio=100% (that is, light is made incident on all of the optical axes),
    green light shown in FIG. 6(a) is emitted (all of green LEDs are turned on).
2. When 100%>the incidence ratio>0% (that is, when a portion of the optical axes is shielded),
    a predetermined number of red LEDs in the lower portion among all of the red LEDs are continuously turned on as shown in FIG. 6(b) in accordance with the ratio of the incident optical axes with respect to the number of all of optical axes. Moreover, the residual portion of the red LEDs, that is, upper red LEDs, are turned off. That is, a bar graph is displayed.
3. When the incidence ratio=0% (that is, all of the optical axes are shielded), display shown in the rightmost portion is performed such that the lowest red LED is blinked and the other LEDs are turned off.

The above-mentioned decoding process is performed so that the bar graph which can easily be recognized is formed.

It is preferable that display of an alarm/an abnormal condition is performed as shown in FIGS. 7(a) and 7(b). That is, 1. When the quantity of received light is insufficiently small (when the quantity of received light is instable level which is the lowest quantity near a predetermined threshold value), display shown in the leftmost portion (A) of FIG. 7(b) is performed such that all of green LEDs are blinked (both of the light emitting unit and the light receiving unit).
2. If disturbance light is detected because measurement has been performed while light emission from the light emitting unit is interrupted, display shown in the portion (B) of FIG. 7(b) is performed such that emission of green light from all of the green LEDs, emission of red light from two red LEDs each of which are disposed at the upper and lower portions the green LEDs and turning off of the other LEDs are alternately repeated (both of the light emitting unit and the light receiving unit also in this case).
3. If an abnormal condition of the light emitting unit is detected, display as shown in the portion (C) of FIG. 7(b) is performed such that all of the red LEDs of the light emitting unit are blinked or all of the LEDs are turned off. Moreover, all of the red LEDs of the light receiving unit are blinked.
4. If an abnormal condition of the light receiving unit is detected, display as shown in the portion (C) of FIG. 7(b) is performed such that all of the red LEDs of the light receiving unit are blinked or all of the LEDs are turned off. Moreover, all of the red LEDs of the light emitting unit are blinked.
5. If another abnormal condition is detected, display as shown in the portion (C) of FIG. 7(b) is performed such that all of the red LEDs are blinked (both of the light emitting unit and the light receiving unit).

As described above, decoding is performed so that display which can easily be recognized is performed.

As described above, according to this embodiment, display of the light insulation is not performed by only one method. That is, the display level of the bar graph is increased/decreased so that the direction in which movement must be performed for adjusting the optical axis is immediately detected. Thus, the adjustment can easily be performed and visibility can be improved.

A second embodiment of the present invention will now be described with reference to FIG. 12.

Figure 12:
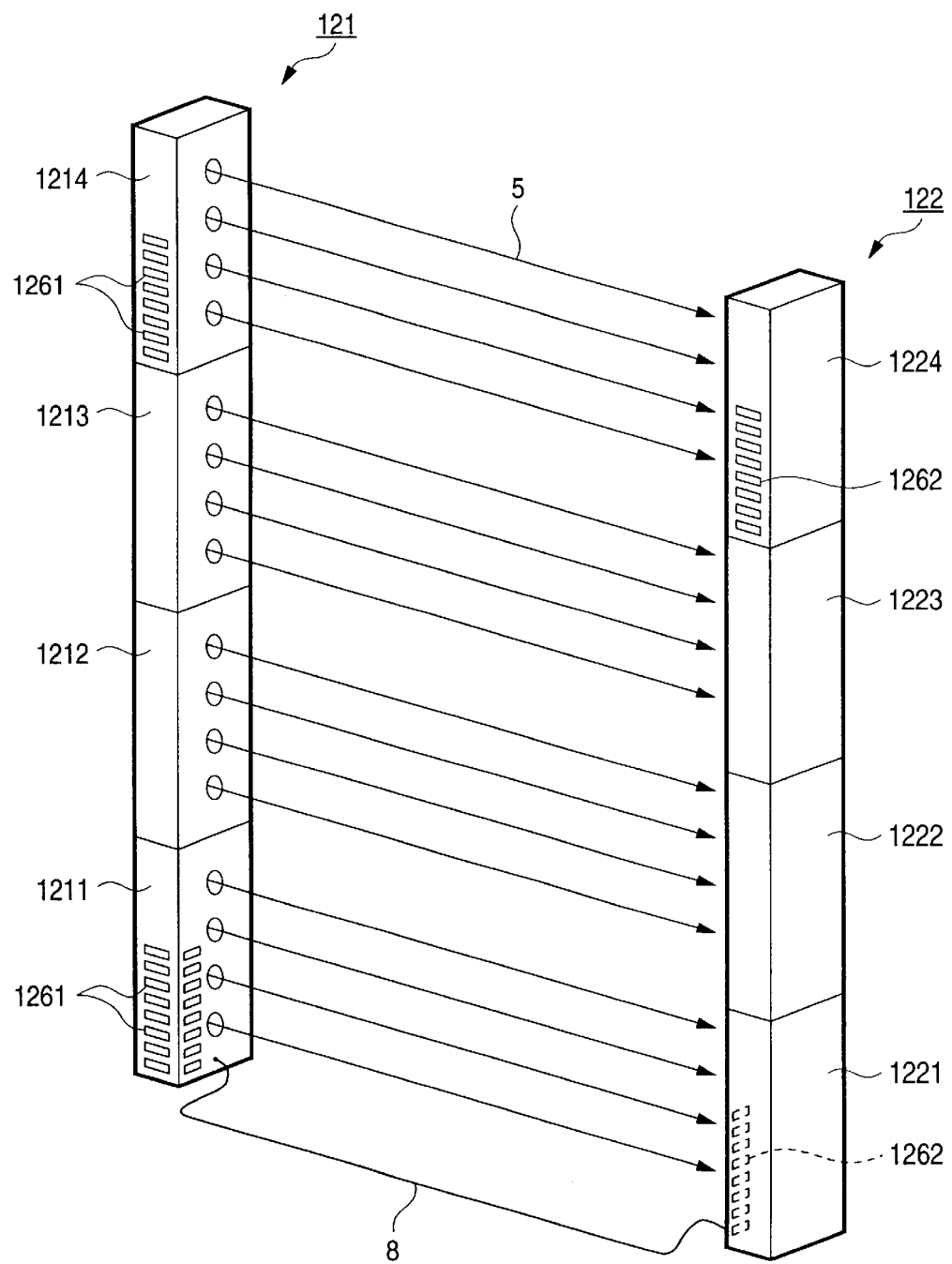
FIG. 12 is a perspective view showing bar graph display units of a multi-optical-axis photoswitch according to a second embodiment of the present invention.

FIG. 12 is a perspective view showing a structure in which a bar graph display unit of a multi-optical-axis photoswitch according to the second embodiment of the present invention is provided for an extension-type multi-optical-axis photoswitch.

The extension-type multi-optical-axis photoswitch comprises a light emitting unit 1211 (base unit) having the function of the light emitting-unit including a controller and the like, and a light receiving unit 1221 (base unit) having the function of the light receiving unit. The foregoing units are connected to each other through the signal line 8 so that the multi-optical-axis photoswitch is constituted. If the detection area is too short in the lengthwise direction of the light emitting unit 1211, light emitting units 1212, 1213, . . . are connected to the base light emitting unit by a required number to enlarge the detection area. Control of the extension-type multi-optical-axis photoswitch is performed such that a maximum number of optical axes required for one cycle is determined at a design step. Moreover, the design is performed such that the operation of the maximum number of the optical axes is permitted. Thus, a common controller can be employed as it is regardless of the number of the light emitting units which must be not larger than the maximum number of the optical axes.

In the second embodiment shown in FIG. 12, four light emitting units 1211 to 1214 are vertically connected in, for example, the light emitting unit 121. Moreover, a plurality of the corresponding light receiving units 1221 to 1224 are vertically connected in the light receiving unit 122. Thus, the multi-optical-axis photoswitch is constituted. The number of the optical axes 5 is increased to enlarge the detection area.

Such an extension-type multi-optical-axis photoswitch is structured such that a bar graph display unit 1261 according to the present invention is provided for the front surface and the side surface of the lowermost light emitting unit 1211 of the light emitting unit 121 and the front surface of the uppermost light emitting unit 1214 of the same. Moreover, a bar graph display unit 1262 is provided for the side surfaces of the lowest light receiving unit 1221 of the light receiving unit 122. When the bar graph display units according to the present invention are provided for the light emitting unit and the light receiving unit and a plurality of the surfaces of the light emitting unit and the light receiving unit, the operability and visibility can be improved.

The display method of each of the bar graph display units 1261 and 1262 is the same as that in the foregoing embodiment. Therefore, the method is omitted from description here.

A third embodiment of the present invention will now be described with reference to FIGS. 13(a) and 13(b).

FIG. 13(a) shows a plurality of examples of the concentrated disposition of a plurality of display lamps, and FIG. 13(b) shows an example of a method of displaying the state.

In FIG. 13(a), portion (A) shows display of the bar graph according to the first embodiment.

Although each of the display lamps is formed into a rectangular segment, circular segments may, of course, be employed which are vertically disposed. The uppermost and lowermost segments may have a relatively large size.

Portion (B) shows circular graph display. Each sector display lamp is formed into a panel and a green LED and a red LED are embedded below the panel.

Portion (C) shows numeric display. Each numeric display lamp is formed into a panel and a green LED and a red LED are embedded below the panel.

Portion (D) shows character display. Each character display lamp is formed into a panel and a green LED and a red LED are embedded below the panel.

Examples of display of each state of each of the sensors of the structures in each of which a plurality of the display lamps are concentrically disposed are shown in FIG. 13(b).

The bar graph display shown in the portion (A) is arranged as follows:
(1) In a normal case where light is made incident on all of the optical axes, all of the segments are turned on in green;
(2) In a normal case where a portion of the optical axes are shielded, the ratio is displayed in red from the lowest segment;
(3) In a case where the quantity of received light is insufficient, all of the segments are blinked in green;
(4) In an abnormal case where disturbance light is received, all of the segments are turned on in green, then a portion is turned on in red and the other segments are turned off. The above display are alternately performed.
(5) In the other abnormal cases, all of the segments are blinked in red.

The circular graph display shown in the portion (B) is arranged as follows:
(1) In a normal case where light is made incident on all of the optical axes, all of the panels are turned on in green;
(2) In a normal case where a portion of the optical axes are shielded, the ratio is displayed in red;
(3) In a case where the quantity of received light is insufficient, all of the panels are blinked in green;
(4) In an abnormal case where disturbance light is received, all of the panels are turned on in green, then a portion is turned on in red and the other panels are turned off. The above displays are alternately performed.
(5) In the other abnormal cases, all of the panels are blinked in red.

The numeric display shown in the portion (C) is arranged as follows:
(1) In a normal case where light is made incident on all of the optical axes, all of the panels are turned on in green;
(2) In a normal case where a portion of the optical axes are shielded, the ratio is displayed in red from the lowest numeral "0";
(3) In a case where the quantity of received light is insufficient, all of the panels are blinked in green;
(4) In an abnormal case where disturbance light is received, all of the panels are turned on in green, then a portion is turned on in red and the other panels are turned off. The above displays are alternately performed.
(5) In the other abnormal cases, all of the panels are blinked in red.

The character display shown in portion (D) is arranged as follows:
(1) In a normal case where light is made incident on all of the optical axes, "OK" is displayed in green;
(2) In a normal case where a portion of the optical axes are shielded, the ratio is displayed in red from the lowest "NO";
(3) In a case where the quantity of received light is insufficient, all of the panels are blinked in green;
(4) In an abnormal case where disturbance light is received, all of the panels are turned on in green, then a portion is turned on in red and the other panels are turned off. The above displays are alternately performed.
(5) In the other abnormal cases, panels other than "OK"are blinked in red.

Figure 14:
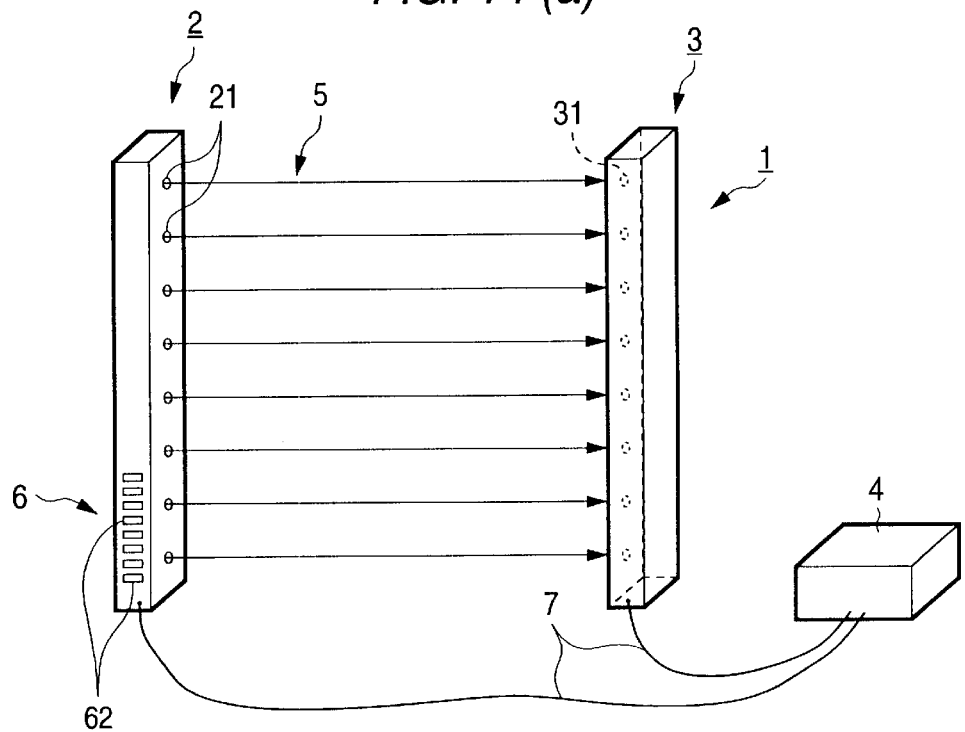
FIGS. 14(a) and 14(b) are overall perspective views showing multi-optical-axis photoswitches according to a fourth embodiment of the present invention.
Figure 14:
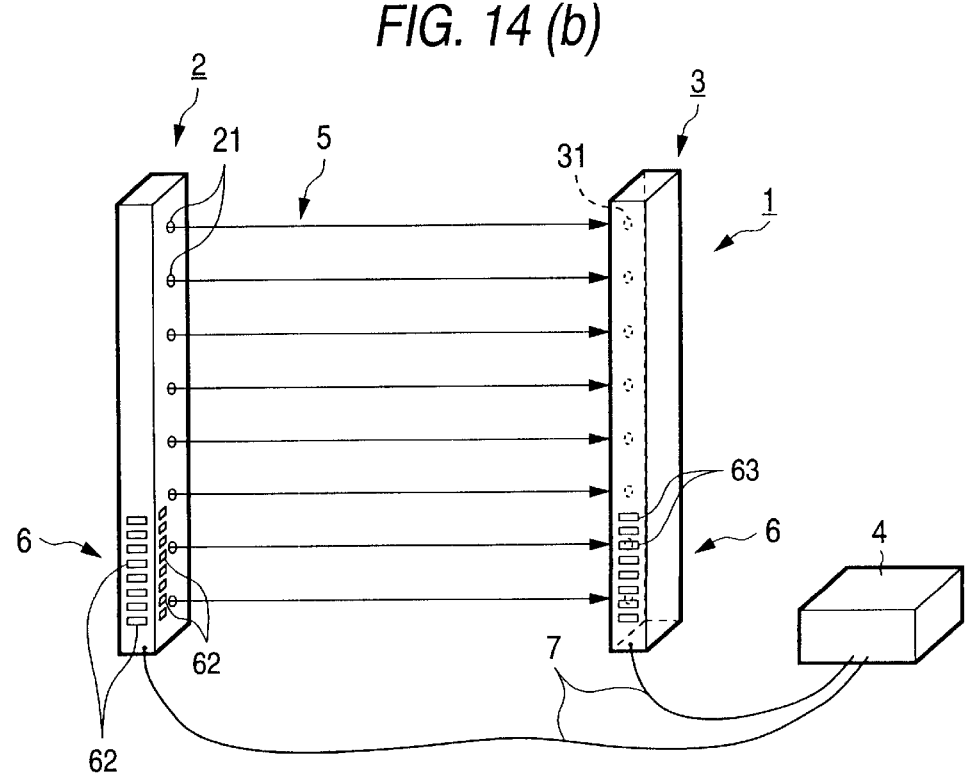

FIGS. 14(a) and 14(b) are perspective views showing multi-optical-axis photoswitches according to a fourth embodiment of the present invention. Reference numeral 1 designates a multi-optical-axis photoswitch comprising a light emitting unit 2, a light receiving unit 3 and a controller 4. The controller 4 controls the light emitting unit 2, the light receiving unit 3 and bar graph display units 62 and 63 through cables 7. This embodiment is characterized in that the light-emitting-unit control circuit, the light-receiving-unit control circuit and the like in the first embodiment of the present invention are accommodated in a common housing. FIG. 14(a) shows an example in which a display unit 6 comprising a bar graph display unit is provided for only the light emitting unit (or the light receiving unit). FIG. 14(b) shows an example in which the bar graph display units 62 and 63 are provided for the light emitting unit 2 and the light receiving unit 3. Moreover, another bar graph display unit 62 is provided for the side surface of the light emitting unit 2.

Figure 15:
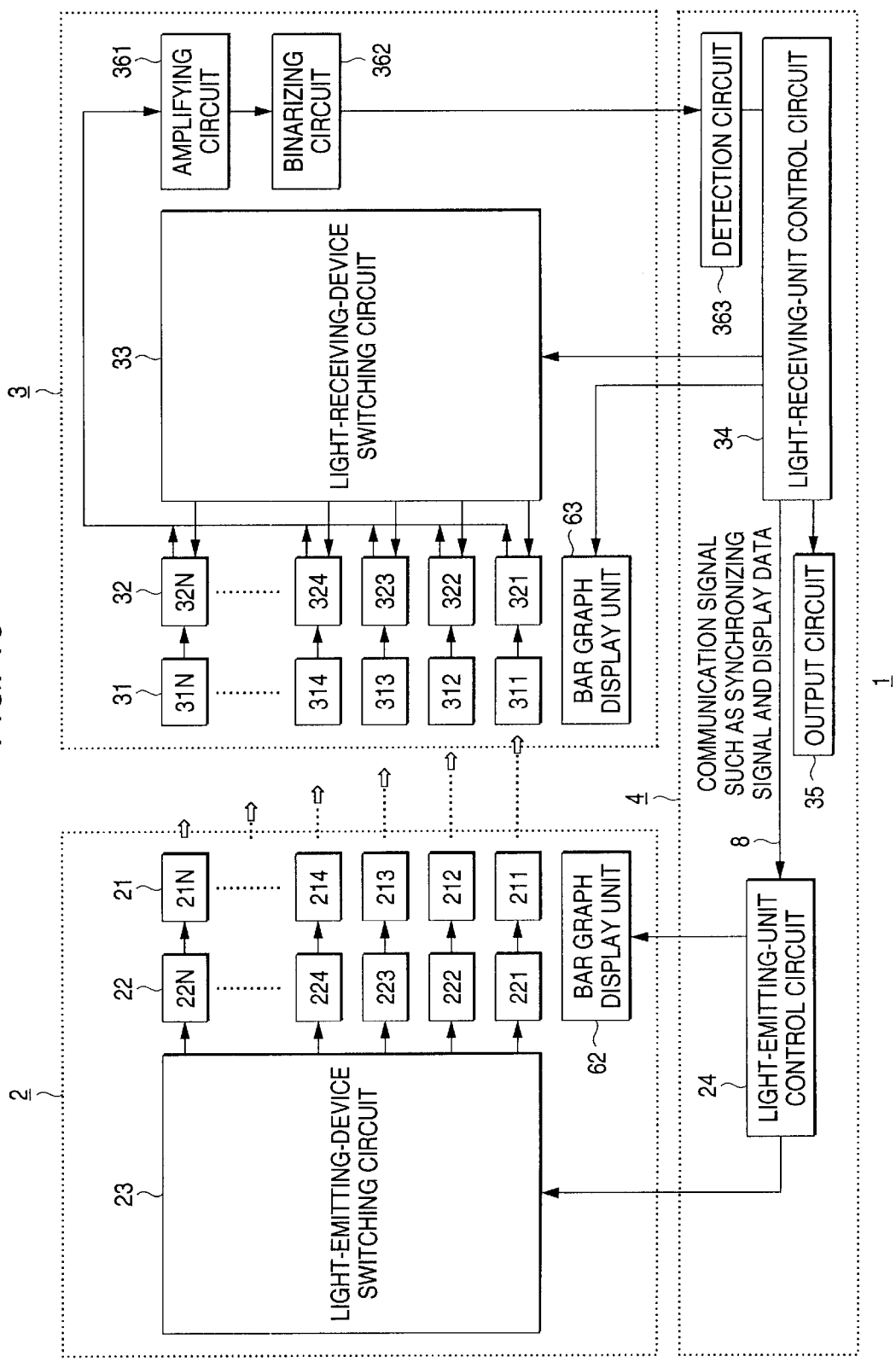
FIG. 15 is a block diagram showing the internal structure of a controller of the multi-optical-axis photoswitch shown in FIG. 14(a) or 14(b).

FIG. 15 is a block diagram showing the internal structure of the controller of the multi-optical-axis photoswitch shown in FIG. 14(a) or 14(b). As can be understood from a comparison between FIG. 15 and FIG. 2, the light emitting devices 21, the light emitting circuits 22, the light-emitting-device switching circuit 23 and the bar graph display unit 62 are disposed in the light emitting unit 2. The light receiving devices 31, the light receiving circuits 32, the light-receiving-device switching circuit 33, the bar graph display unit 63, the amplifying circuit 361 for collectively amplifying light receipt signals from the light receiving circuits 32 and the binarizing circuit 362 for converting the amplified signals into 1 and 0 with respect to a predetermined threshold value are disposed in the light receiving unit 3. Although the. foregoing structure is the same as that shown in FIG. 2, the other circuit elements and the like are collectively accommodated in the controller 4. That is, the controller 4 accommodates the detection circuit 363 for determining a state of light incidence in accordance with a binarized signal, the light-receiving-device control circuit 34 for controlling the system of the light receiving unit 3, the light-emitting-device control circuit 24 which receives the synchronizing signal and display data transmitted from the light-receiving-device control circuit 34 to the light emitting unit 2 so as to control the system of the light emitting unit and the output circuit 35 for interrupting the operation of the pressing machine or the like.

Thus, the sizes and weights of the light emitting unit 2 and the light receiving unit 3 can be reduced, causing the apparatus to easily be disposed in a detection area. Moreover, the elements relating to the control can be concentrically disposed. Therefore, the elements can commonly be used, wiring can be shortened, assembling, maintenance and inspection can easily be performed and the cost can be reduced.

Although the description of the present invention has been made about the multi-optical-axis photoswitch for improving the safety of the operator of a pressing machine or the like, the present invention is not limited to this. The present invention may be applied to an area sensor for an industrial robot, a variety of security and/or alarm apparatus and the like for use in a plant.

As described above, according to the present invention, the multi-optical-axis photoswitch in which a multiplicity of optical axes each of which is composed of a pair of the light emitting device and the light receiving device exist has the structure that the number of optical axes in which the quantity of received light exceeds a predetermined threshold value is counted. Moreover, the count or the ratio with respect to the number of all of the optical axes is displayed as a bar graph by a plurality of display lamps. The bar graph display method is employed which uses the bar graph display unit which has a plurality of the green and red display lamps and which variously displays the shielded state in place of display of only one state. Thus, visibility can be improved. Therefore, adjustment of the optical axis can easily and accurately be performed by dint of the bar graph display. Thus, the present invention attains an index for quickly detecting the height, area and size of an object detected in a detection area. Therefore, safety and protection can satisfactorily be improved. Since the display area realized by the display lamps can somewhat be enlarged, an effect can be obtained in that visibility can be improved in addition to the effect obtainable from the foregoing display method.

What is claimed is:

1. A state displaying method for displaying a state of a multi-optical-axis photoswitch which incorporates a light emitting unit and a light receiving unit between which a multiplicity of optical axes exist which are realized by pairs of emitted light and received light, said method comprising the steps of:

calculating a ratio of the number of optical axes in which quantity of received light has exceeded a predetermined threshold value with respect to the number of all of the optical axes; and causing a plurality of display lamps disposed concentrically to display the calculated ratio.

2. The state displaying method according to claim 1, wherein display of the ratio is performed in the form of a bar graph.

3. The state displaying method according to claim 1, wherein display of the ratio is performed by the display lamps in different colors.

4. A multi-optical-axis photoswitch incorporating a light emitting unit and a light receiving unit between which a multiplicity of optical axes exist which are realized by pairs of emitted light and received light, said photoswitch comprising:

a counter for counting the number of optical axes in which a quantity of received light. has exceeded a predetermined threshold value;

displaying means including a plurality of display lamps disposed concentrically;

calculating means for calculating a ratio of the number of optical axes counted by said counter with respect to the number of all of the optical axes; and display control means for controlling said plural display lamps to display a result of a calculation performed by said calculating means as a bar graph.

5. The multi-optical-axis photoswitch according to claim 4, wherein said displaying means is disposed at a plurality of positions in the light emitting unit or light receiving unit.

6. The multi-optical-axis photoswitch according to claim 4, wherein said displaying means is provided for the light emitting unit and/or the light receiving unit.

7. The multi-optical-axis photoswitch according to claim 4, wherein said plural display lamps are display lamps in different colors.

8. The multi-optical-axis photoswitch according to claim 7, wherein said plural display lamps are structured such that (1) when light is made incident on all of the optical axes in a normal state, all of said display lamps emit green light and/or (2) when light is shielded, a portion of display lamps emit red light corresponding to a ratio of the number of optical axes on which light has been made incident.

9. The multi-optical-axis photoswitch according to claim 8, wherein when a quantity of received light is insufficiently small, all of green display lamps are blinked.

10. The multi-optical-axis photoswitch according to claim 8, wherein when disturbance light has been detected, lighting of all of the green display lamps and lighting of a portion of the red display lamps are alternately repeated.

11. The multi-optical-axis photoswitch according to claim 4, wherein when an abnormality occurs, a portion or all of said plural display lamps are blinked.

12. A extension-type multi-optical-axis photoswitch comprising a plurality of multi-optical-axis photoswitch units connected to one another, wherein the multi-optical-axis photoswitch according to claim 4 is employed as one or a plurality of said multi-optical-axis photoswitch units.

* * * * *